62-269
OR RE 24,258
SEARCH ROOM
BEST AVAILABLE COPY
Dec. 25, 1956 D. BURLIUK ET AL Re. 24,258
RECESSED LIGHTING EQUIPMENT
Original Filed April 25, 1950 3 Sheets-Sheet 1
Fig. 1.
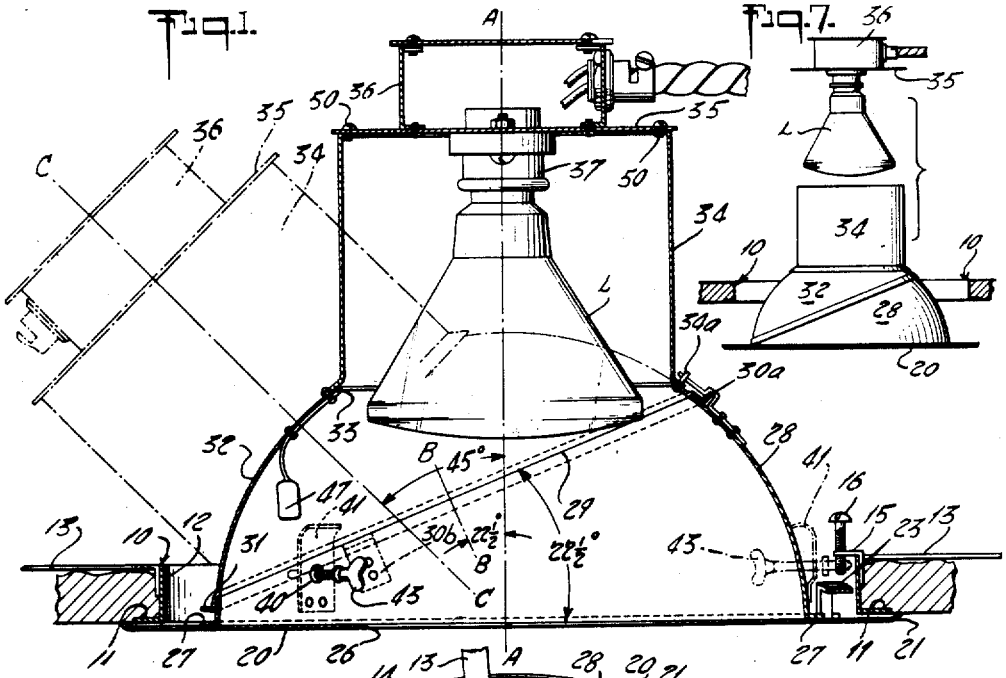
Fig. 7.
Fig. 2.
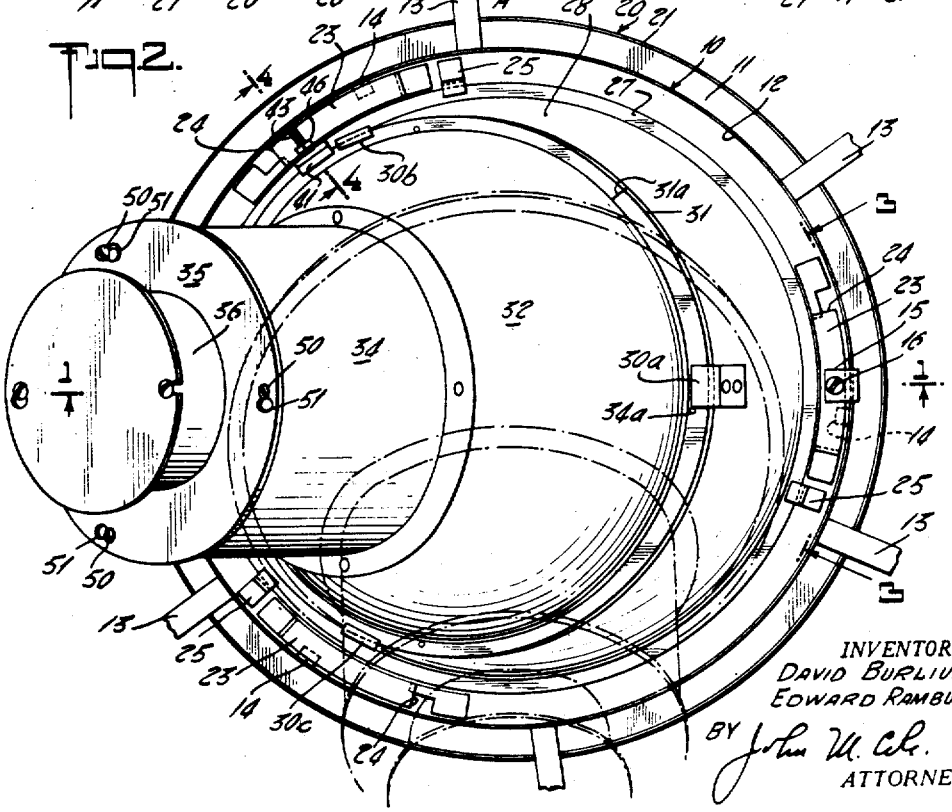
INVENTORS
DAVID BURLIUK and
EDWARD RAMBUSCH
BY John W. Ch.
ATTORNEY Dec. 25, 1956 D. BURLIUK ET AL Re. 24,258

RECESSED LIGHTING EQUIPMENT

Original Filed April 25, 1950 3 Sheets-Sheet 2

INVENTORS
DAVID BURLIUK and
BY EDWARD RAMBUSCH
John W. Ath
ATTORNEY

INVENTORS
DAVID BURLIUK
EDWARD RAMBUSCH
BY John M Cole
ATTORNEY

United States Patent Office

Re. 24,258
Reissued Dec. 25, 1956

24,258

RECESSED LIGHTING EQUIPMENT

David Burliuk, Huntington, and Edward Rambusch, Harrison, N. Y., assignors to Rambusch Decorating Company, New York, N. Y., a corporation of New York Original No. 2,716,185, dated August 23, 1955, Serial No. 158,026, April 25, 1950. Application for reissue March 7, 1956, Serial No. 570,205

15 Claims. (Cl. 240—78)

Matter enclosed in heavy brackets [ ] appears in the original patent but forms no part of this reissue specification; matter printed in italics indicates the additions made by reissue.

The present invention relates to recessed lighting equipment and is more particularly directed toward recessed lighting equipment for producing orientable light beams of varying slope.

The present invention contemplates forms of lighting equipment for such purposes according to which a supporting ring, such as a plaster ring, is fixedly carried in the ceiling, or false ceiling as the case may be, and the remaining parts of the fixture are detachably supported from this ring. Except for a finishing plate, the entire fixture is above the ceiling line.

The present invention contemplates a construction according to which it is possible to install the fixture in this fixed ring either entirely from below the ceiling or entirely from above the ceiling. This makes it possible to have the same structure fit either condition which may be encountered. Where the fixture is to be installed from below, it may be preassembled and connected to a flexible wiring conduit, carried in the space above the ceiling, and then the entire fixture, except for the finishing plate, is passed up through the plaster ring and secured in place. On the other hand, where the fixture is to be installed from above, certain parts, including the finishing plate, may be hoisted from below and positioned in the plaster ring, while other parts connected to the wiring may be secured to the hoisted part. Where the luminaire is accessible from below, the lamp may be removed downwardly and where it is accessible only from above the ceiling, the upper part of the luminaire may be detached so as to give access to the lamp. The finishing plate is too large to pass through the plaster ring and is apertured to admit the lamp and to allow the light to escape. This plate supports two housing members, the lower of which is adjustable about a vertical axis, while the upper is adjustable on the lower about a sloping axis. The upper part carries the lamp.

According to the present invention means are provided whereby one can, by reaching through the opening in the finishing plate, adjust the lamp housing parts about the respective axes so as to vary the slope of the lamp axis and its orientation about the vertical axis.

According to the present invention provisions are also made whereby any adjustment of the lamp housing, whether obtained by manipulation from below or from above, may be maintained by releasably locking the parts in such adjusted position so that they are not thereafter shifted during relamping and cleaning operations.

Other and further objects will appear as the description proceeds.

For purposes of illustrating the present invention the drawings show an embodiment in which the invention may take form, together with modifications, it being understood that the drawings are illustrative of the invention rather than limiting the same.

In the drawings:

Figure 1 is a sectional view through the luminaire, showing in full lines the lamp housing members in position for providing a vertical beam, and in dotted line position these parts in position for providing a sloping beam of about 45° from the nadir, the section being taken on the line 1—1 of Figure 2;

Figure 2 is a top plan view of the luminaire of Figure 1 showing in full lines the position of the part corresponding with the dot and dash lines of Figure 1 and showing in dot and dash lines the upper segment and parts carried thereby shifted through 90° in azimuth from the full line position;

Figure 7 is a diagrammatic view illustrating the installation of the luminaire from above the ceiling [.] *; and*

Figure 3:
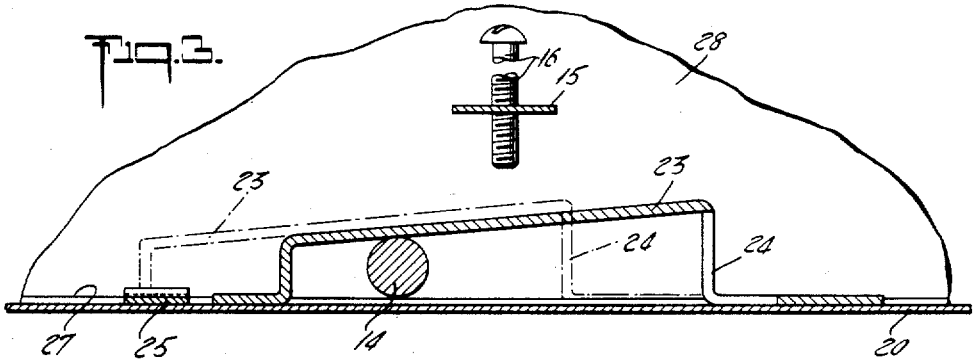
Figure 3 is an enlarged sectional view on the curved arc 3—3 of Figure 2 looking in the direction of the arrows and showing the interlocking of the stationary plaster ring and the lower housing parts.
Figure 4:
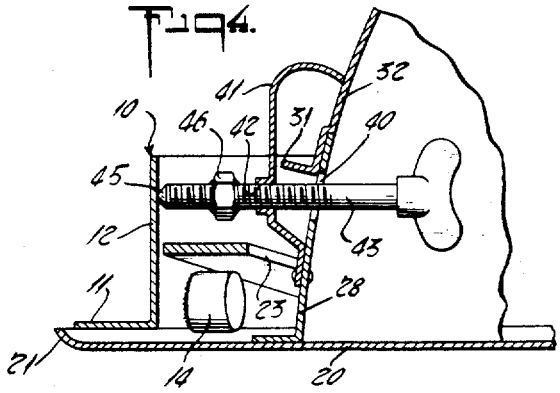
Figure 4 is an enlarged sectional view on the line 4—4 of Figure 2 showing the locking of the upper housing members and lower segments to the plaster ring to prevent shift of these members.
Figure 5:
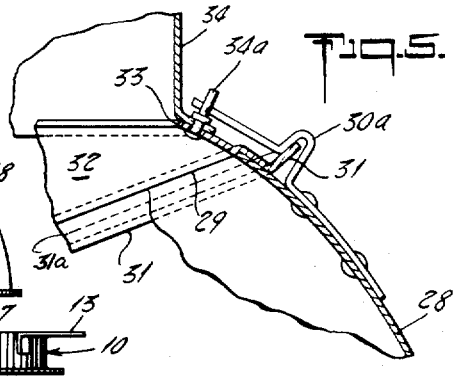
Figure 5 is an enlarged, fragmentary sectional view taken on the same plane as Figure 1.
Figure 6:
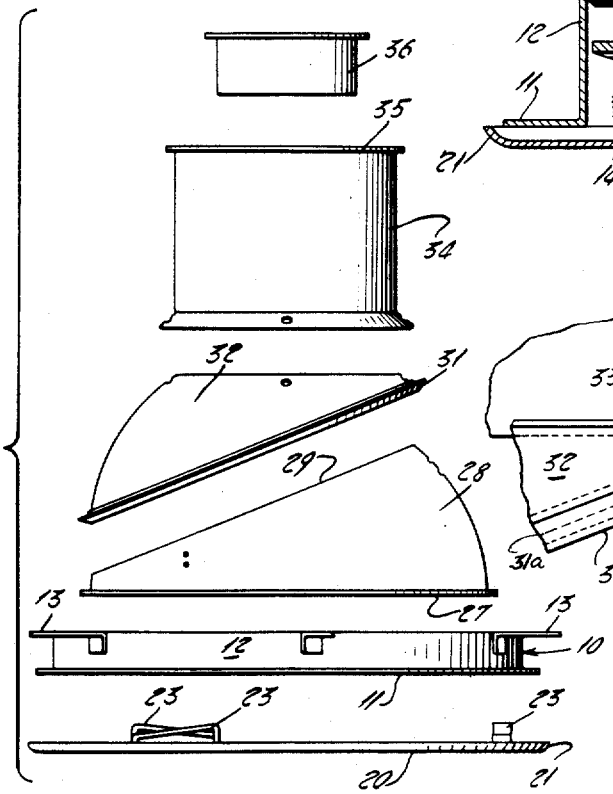
Figure 6 is an exploded view showing the principal parts of the device; [and]

In order to prepare the ceiling construction for the reception of the principal parts of the luminaire it is contemplated that a suitable plaster ring such as indicated at 10 will be placed in the ceiling and permanently fastened in place. The ring in the form shown has an angle cross section with horizontal flange 11 and vertical flange 12. A number of outwardly bent metal straps 13, adapted to be embedded in the plaster or fastened in any suitable way to the ceiling material, are welded to the flange 12. This ring is provided with three regularly spaced inwardly extending studs or bosses 14, and carries an inwardly extending bracket 15 shown adjacent one of the bosses 14. This bracket 15 carries a relatively long screw 16 whose primary purpose is to afford a stop. It is adapted to be adjusted vertically.

The other parts of the fixture are in the form of a unit capable of being preassembled; a unit which can be secured in place in the plaster ring and supported thereby. When it is to be placed in position from underneath all the wiring is completed and the entire assembly is passed up into position from underneath and fastened in place. When such mode of assembly is contemplated the parts are all assembled as they appear in Figures 1–5 of the drawings. The face plate or finishing ring of the fixture is indicated at 20. This is a relatively flat plate with slightly upturned edge 21 and it carries three ramp forming straps 23 provided with notches indicated at 24. These notched straps are so located as to permit passing the straps upwardly into the opening in the plaster ring 10 and the notches 24 are so located that upon a clockwise turning (from below) of the finishing ring relative to the plaster ring the bosses 14 can pass through the notches 24 and underneath the ramps 23. When turned as far as possible these parts are brought to the relative position shown in Figure 3 and the finishing ring is supported from the plaster ring. The ring 20 is brought against the plaster ring, or ceiling very tightly so that accidental unloosening is impossible.

The finishing ring or plate 20 also carries a number of clips 25, three being shown adjacent the low end of the ramp members 23. The plate 20 has a central opening 26 preferably somewhat larger than the outer diameter of the lamp bulb to be used. The clips 25 loosely receive the flange 27 of a lower housing part 28, conveniently in the form of a spherical segment so that it is possible to turn it about on a vertical axis while it is held in place by the clips. The upper edge of the spherical segment 28 is cut on an oblique plane such as indicated at 29, preferably at an angle of 22½° with the horizontal. The spherical segment 28 carries three clips 30a, 30b, 30c annularly disposed in this oblique plane and adapted to receive the flange 31 of an upper housing part 32, also in the form of a spherical segment. This upper spherical segment is held in place by these clips 30 but is freely adjustable about sloping axis B—B, which slopes at the corresponding angle, preferably 22½°. To facilitate assembly the flange 31 is split at 31a and first bent up and down to admit the clips and then bent back in place.

The segment 32 has an upper opening 33 somewhat larger in size than the diameter of the lamp to be used and carries an upwardly extending cylindrical band 34. The spherical segment 32 and band 34 are riveted together, one of the rivets 34a used to secure parts 32 and 34 together [is] *being* engageable with the clip 30a to provide a stop. The band 34 carries a detachable plate 35 to which [is] *are* secured splicing box 36 and a lamp socket 37, the latter carrying the *projector type* lamp L of the PAR–38 type, or R40 type.

The lower housing part or spherical segment part 28 is provided with a clearance hole 40 below the level of the upper edge plaster ring 12 when the parts are assembled. Part 28 carries a spring member 41 with threaded hole 42 in which is a thumb screw 43. The screw has a grip inside the spherical segment 28 and a pointed end 45 adapted to be brought against the inner surface of the plaster ring flange 12, and carries a fixed nut 46. The spring 41 also extends up past the flange 31 and when the screw is tightened against the plaster ring the end of the spring bears against segment 32. When the thumb screw 43 is turned to shift this screw away from the plaster ring, one can use the screw as a handle accessible from underneath for the purpose of turning the lower segment 28 and all parts carried thereby about a vertical axis. This turning is limited by engagement of the thumb screw 43 with the plaster ring carried screw 16. When this thumb screw is loosened one can also reach in through the opening 26 and grasp a finger grip 47 carried by the upper segment 32 so that this segment can be turned about the oblique axis B—B. This turning is possible because the spring 41 is free from the flange 31.

In the arrangement above discussed it is possible to shift the upper segment through substantially 360° about the sloping axis B—B so as to shift the lamp axis from a vertical position as shown in full lines to one in which it slants at an angle of about 45° as shown by the axis C—C, Figure 1. By turning the entire organization about the vertical axis A, A it is possible to orient the sloping beam in all azimuths and hence it is possible by appropriate adjustments of the two housing parts (spherical segments), one of which turns on the other, to obtain orientation of beam and adjustment of beam [sloping] *slope* throughout a cone of 45° each side of the nadir. The stops prevent turning the parts through more than 360° so that the wiring is protected.

When it is necessary to assemble and service the fixture from above, the plaster ring is mounted as before (see Figure 7) and a preliminary assembly made of the facing ring 20, housing parts 28 and 32, and band 34. These may be brought up into position from underneath by a rope or cord passed down through the hole in the plaster ring, and, when brought up into position, can be manipulated to lock the parts together. Under these conditions, the screw 16 carried by the plaster ring is accessible for threading down against the top of the ramp so as to prevent loosening of the plate 20 from the plaster ring. The junction box and socket during these operations is detached from the other parts of the unit and is later secured in place by the screws 50 and bayonet slots 51, Figure 2. These parts are easily separated when it is desired to relamp the fixture from above.

Figure 8:
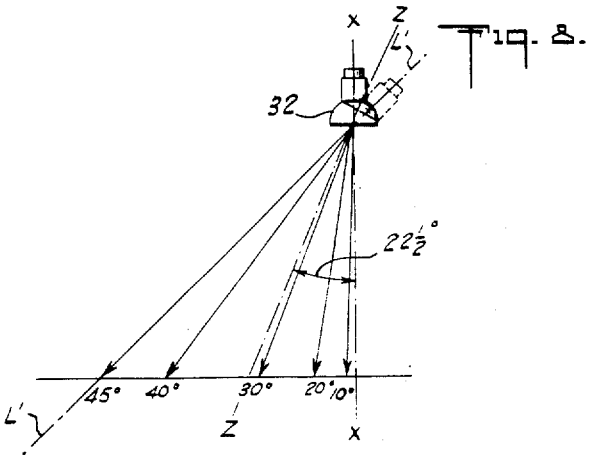
*Figures 8 and 9 are diagrammatic vertical and plan views illustrating adjustments available in the luminaire.*
Figure 9:
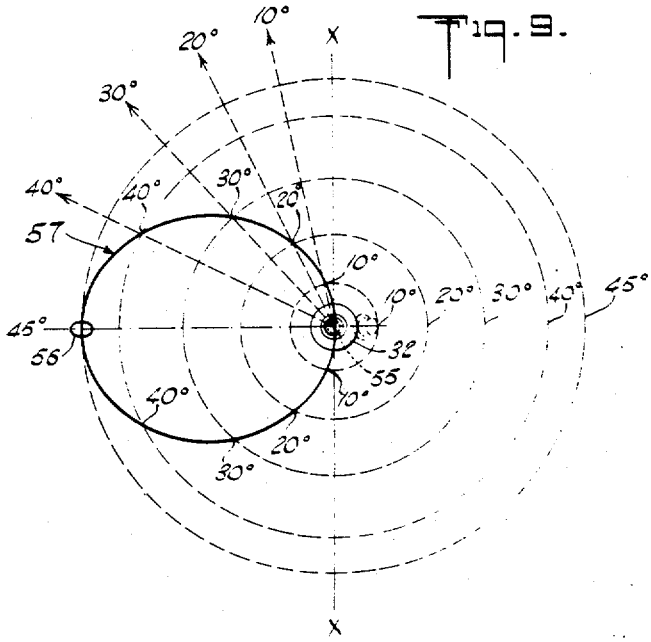

*Reference is now made to Figures 8 and 9, which diagrammatically show the adjustments possible in a fixture with 45° maximum beam throw. Here, the vertical axis about which the entire fixture turns is indicated at X—X. The axis of the cone through which the lamp axis L—L passes, when turned about the oblique axis, is indicated at Z—Z. The lower trace line L'—L' of the lamp axis shows how long the lamp can be adjusted and how high the beam may be directed. After converging to an apex and passing through the central opening 26, the central ray of the beam diverges from the vertical and also lies in a cone.*

*When the lamp is in the vertical axis X—X, the spot of light produced in a horizontal work surface is indicated by the small dotted central circle 55, Figure 9. If the upper part 32 is turned through 180 about axis Z—Z, the spot is thus centered about the point where line L'—L' meets the floor. This spot will be elongated, as indicated at 56. If the upper part 32 is turned in a clockwise direction viewed from above, the spot 55 will move over the floor in a closed elliptical path in a clockwise direction, as indicated at 57. By shifting the lamp carrier 32 back and forth through 180°, it will traverse one half of the ellipse as it sweeps across the region between nadir and 45° from nadir.*

*When the structure is turned about the vertical axis X—X, the axis Z—Z traverses cones up to 45° apex angle, and the axis L'—L' traverses the shell of a cone up to 45° from the nadir. By turning the lower part 28, the spot may be made to traverse circles, Figure 9, marked with the angle of beam slope. By concurrent adjustment of the lower part 28 about the vertical axis and of the upper part 32 about the lower part, the spot of light may be placed in any azimuthal direction and at any displaced position from nadir within the range provided.*

*When the adjustment is for an intermediate beam angle, such as 40° indicated in Figure 9, it is possible to have light strike a spot from either of two positions of the lamp, depending upon the position to which the upper part is turned. This makes it possible to secure greater flexibility of adjustment and avoid obstructions in the attic.*

Since it is obvious that the invention may be embodied in other forms and constructions within the scope of the claims, we wish it to be understood that the particular forms shown are but a few of these forms, and various modifications and changes being possible, we do not otherwise limit ourselves in any way with respect thereto.

What is claimed is:

1. A lighting fixture of the recessed type adapted for mounting and servicing entirely from below the ceiling or entirely from above the ceiling, comprising a mounting ring permanently carried in the ceiling and having inwardly extending lugs and a fixture body having two separable components, one a lower component, the other an upper component, the lower component including an apertured finishing plate for covering the mounting ring and having receivers for the lugs and an upper lamp housing, the upper component including a junction box adapted to be connected to a current supply cable and carrying a cover plate fitting the top of the lamp housing, a downwardly opening lamp socket carried by the cover plate externally accessible means for securing the cover plate and housing together, the two components, after connection to the supply cable and when connected together, being movable upwardly to bring the lugs and lug receivers together so that the fixture is supported and the lamp is accessible, the first component, when disconnected from the second being hoistable up to position for securement in place, the second component being attachable and detachable from above to effect relamping.

2. A recessed luminaire comprising a fixed ceiling supported ring having inwardly extending lugs, a lamp housing insertable through the ring and having an opening for escape of light, a finishing plate larger in diameter than the ring carrying the lamp housing and normally positioned against the lower face of the supporting ring, a pendant lamp in the housing for projecting a beam of light through the openings, a plurality of circumferentially extending straps secured at their ends to the top of the plate and angularly spaced the same as the lugs, the straps having risers interconnected by intermediate portions spaced above the plate to provide cams, the risers at the upper ends of the cams being cut away at the proper radius to admit the lugs so that when the plate is so positioned to bring the cut away portions of the straps opposite the lugs the plate may be turned to bring the cams above the lugs so that the strap carrying plate is supported from the lugs.

3. An overhead lighting fixture for producing a downwardly directed dirigible beam comprising a lower housing part in the form of a segment of a downwardly facing hemisphere below an oblique plane above the horizontal, and an upper housing part in the form of a spherical segment occupying the portion of the hemisphere above the oblique plane and below a horizontal truncating plane above the oblique plane, a horizontal apertured supporting plate, means for mounting the lower housing part on the apertured plate for rotation about the vertical axis of the aperture in the plate, means for mounting the upper housing part on the lower housing part for rotation about an axis normal to the oblique plane, a lamp socket support secured to the upper housing part, a socket carried on the support with its axis normal to the truncating plane, and a projector type lamp carried in the socket and projecting its beam toward the aperture in the supporting plate.

4. Overhead lighting equipment having means for producing a downwardly directed dirigible light beam comprising a lower member, mounted for angular adjustment about a vertical axis, and an upper member, the lower member having a central opening in a horizontal plane and carrying above it the upper member for bodily movement therewith about the vertical axis, interconnections between the lower and upper members for guiding the upper member for rotation on the lower member about an oblique axis, and a lamp socket carried by the upper member for bodily movement therewith and having the axis of the socket angularly displaced from the oblique axis in the same amount as the oblique axis is displaced from the vertical axis and a socket carried lamp for projecting a beam of light in the direction of the socket axis and through the aperture in the lower member, whereby the angle of slope of the beam may be varied by shifting the lower member on the upper member and the orientation of the beam by angular adjustment of the first member about the vertical axis.

5. Overhead lighting equipment such as claimed in claim 4 wherein the members each have a handle accessible through the aperture in the plate for positioning the respective member.

6. Overhead lighting equipment such as claimed in claim 4, having a fixed supporting plate on which the lower member is rotatably mounted and provided with a ring spaced outside the first member, a leaf spring carried by the outside of the lower member and extending upwardly outside the upper member, a horizontally extending threaded member carried by and threadedly related to the spring and having an inner end accessible inside the lower member and an outer end engageable with the ring so that upon threading it to bring the outer end against the ring the spring is pressed back against the lower member to lock both members against movement.

7. An overhead lighting fixture comprising a lamp housing including two parts one above the other, the lower part having about a fixed vertical axis a normally horizontal circular opening and about an oblique axis of fixed slope angle an upper circular opening, the upper part having a lower circular opening fitting about the upper circular opening of the lower part and being secured to the lower part for angular adjustment about the oblique axis, the upper part of the housing carrying an incandescent lamp socket and pendent projector lamp, the lamp axis and socket axis being displaced from the oblique axis the same amount as the oblique axis is displaced from the vertical axis, whereby, upon turning of the upper part on the lower part and about the oblique axis of the upper opening of the lower part, the angle of slope of the lamp axis may be varied through twice the slope angle of the axis of the circular opening, and a horizontal apertured plate on which the lower housing part is mounted for turning about the vertical axis whereby the sloping lamp axis may be swung about the surfaces of corresponding cones.

8. A lighting fixture as claimed in claim 7, wherein the lamp socket and lamp are carried in an upwardly removable cover plate whereby access to the lamp may be had from above the lamp housing.

9. A lighting fixture comprising a two-part lamp housing as claimed in claim 7, having devices accessible through the apertured plate for adjusting the two parts as a unit about the vertical axis or for holding the lower part against turning while the upper part is turned on the lower part.

10. An overhead lighting fixture comprising a lamp housing including two parts one above the other, the lower part having about a fixed vertical axis a normally horizontal circular opening and about an oblique axis of fixed slope angle an upper circular opening, the upper part having a lower circular opening fitting about the upper circular opening of the lower part and being secured to the lower part for angular adjustment about the oblique axis, the upper part of the housing carrying an incandescent lamp socket and pendent projector lamp, the lamp axis and socket axis being displaced from the oblique axis the same amount as the oblique axis is displaced from the vertical axis, whereby, upon turning of the upper part on the lower part and about the oblique axis of the upper opening of the lower part, the angle of slope of the lamp axis may be varied through twice the slope angle of the axis of the circular opening, a horizontal apertured plate on which the lower housing part is mounted for turning about the vertical axis, a fixed ring above the apertured plate and outside the lower housing part, a radially disposed bolt threadedly supported from the lower housing part for radial adjustment and having an inner end providing a handle to facilitate turning the lower part about the vertical axis whereby the sloping lamp axis may be swung about the surfaces of corresponding cones, the outer end of the bolt upon turning the bolt to move the end outwardly being forceable against the ring to prevent such turning of the lower part.

11. A lighting fixture as claimed in claim 10, wherein the threaded support for the bolt includes a leaf spring extending opposite the upper housing part and biased away from it, the spring being flexed into engagement with the upper housing part when the outer end of the bolt is threaded against the ring.

*12. Overhead lighting equipment having means for producing a downwardly directed dirigible light beam comprising a lower member, mounted for angular adjustment about a vertical axis, and an upper member, the lower member having a central opening in a horizontal plane and carrying above it the upper member for bodily movement therewith throughout substantially 360° about the vertical axis, interconnections between the lower and upper members for guiding the upper member for bodily movement on the lower member throughout substantially 360° about an oblique axis which intersects the vertical axis at substantially the level of the central opening, a lamp socket carried by the upper member for bodily movement therewith and having the axis of the socket angularly displaced from the oblique axis in the same amount as the oblique axis is displaced from the vertical axis, and a socket-carried projector type lamp for projecting a beam of light in the direction of the socket axis*

*and through the center of the opening in the lower member, the adjustment of the upper member through substantially 360° about said vertical axis being effective to cause the axis of the emergent beam to fall on a horizontal light receiving area in an elliptical pattern, with one end of the ellipse coincident with the vertical axis and the other end of the ellipse displaced therefrom a distance dependent upon the angle the oblique axis makes with the vertical axis and the mounting height of the equipment, and to intersect at two points concentric circles in this plane and of intermediate radius, whereby light may be projected onto any such intermediate point from either of two adjusted positions of the members.*

*13. A lighting fixture comprising a lamp carrier, means for mounting the lamp carrier for turning movement throughout substantially 360° about an axis oblique to the vertical, a projector type incandescent lamp secured to the lamp carrier in a position to project a light beam across the said oblique axis at an angle corresponding with the angle the oblique axis makes with the vertical whereby the beam axis traverses the surface of a circular cone with apex angle twice the angle of slope of the oblique axis, and annular means for mounting the lamp carrier mounting for bodily turning movement through substantially 360° about a vertical axis substantially coincident with the uppermost position of the beam axis, whereby upon turning the lamp carrier about the oblique axis, the beam falls on a horizontal light-receiving area in an elliptical pattern extending outwardly from the said vertical axis, and upon bodily turning the mounting for the lamp carrier about the vertical axis, the elliptical pattern may be azimuthally adjusted through substantially 360°.*

*14. The combination with a projector type incandescent lamp adapted to produce a concentrated light beam, of an overhead, two-part, lamp support, one part being above the other, wholly supported therefrom and directly supporting the lamp in a position to direct light downwardly,*

*means for supporting a lower part for adjustment through substantially 360° about a vertical axis, means for supporting the upper part for adjustment through substantially 360° about an oblique axis making the same angle with the vertical which the beam axis of the light from the lamp makes with the oblique axis, and in a position such that when the beam axis is vertical, it coincides with the vertical axis.*

*15. Overhead lighting equipment for lighting selected spots on a circular work area in a horizontal surface below the lighting equipment, said lighting equipment including a first part mounted for turning movement through substantially 360° about the vertical axis through the center of the area and a second part mounted in the first for turning movement through substantially 360° about an oblique axis and carrying a projector type lamp in a position to direct its beam at the same angle to the oblique axis which the oblique axis makes with the vertical and to dispose the lamp axis substantially in the said vertical axis whereby the spot traverses an elliptical path upon adjustment of the second part and a circular path of varying radius upon adjustment of the first part.*

References Cited in the file of this patent or the original patent

UNITED STATES PATENTS

| | | |
|---|---|---|
| 1,827,980 | Galetzky | Oct. 20, 1931 |
| 1,869,823 | Reader | Aug. 2, 1932 |
| 2,116,317 | Marshall et al. | May 3, 1938 |
| 2,243,712 | Levy | May 27, 1941 |
| 2,302,276 | Violet | Nov. 19, 1942 |
| 2,330,935 | Tuck | Oct. 5, 1943 |
| 2,434,108 | Handler | Jan. 6, 1948 |
| 2,465,248 | McCandless | Mar. 22, 1949 |
| 2,588,760 | Pryne | Mar. 11, 1952 |